June 5, 1928.  
W. C. BLACKETT  
1,672,598  
AUTOMOBILE TRAILER CONNECTION  
Filed March 13, 1926
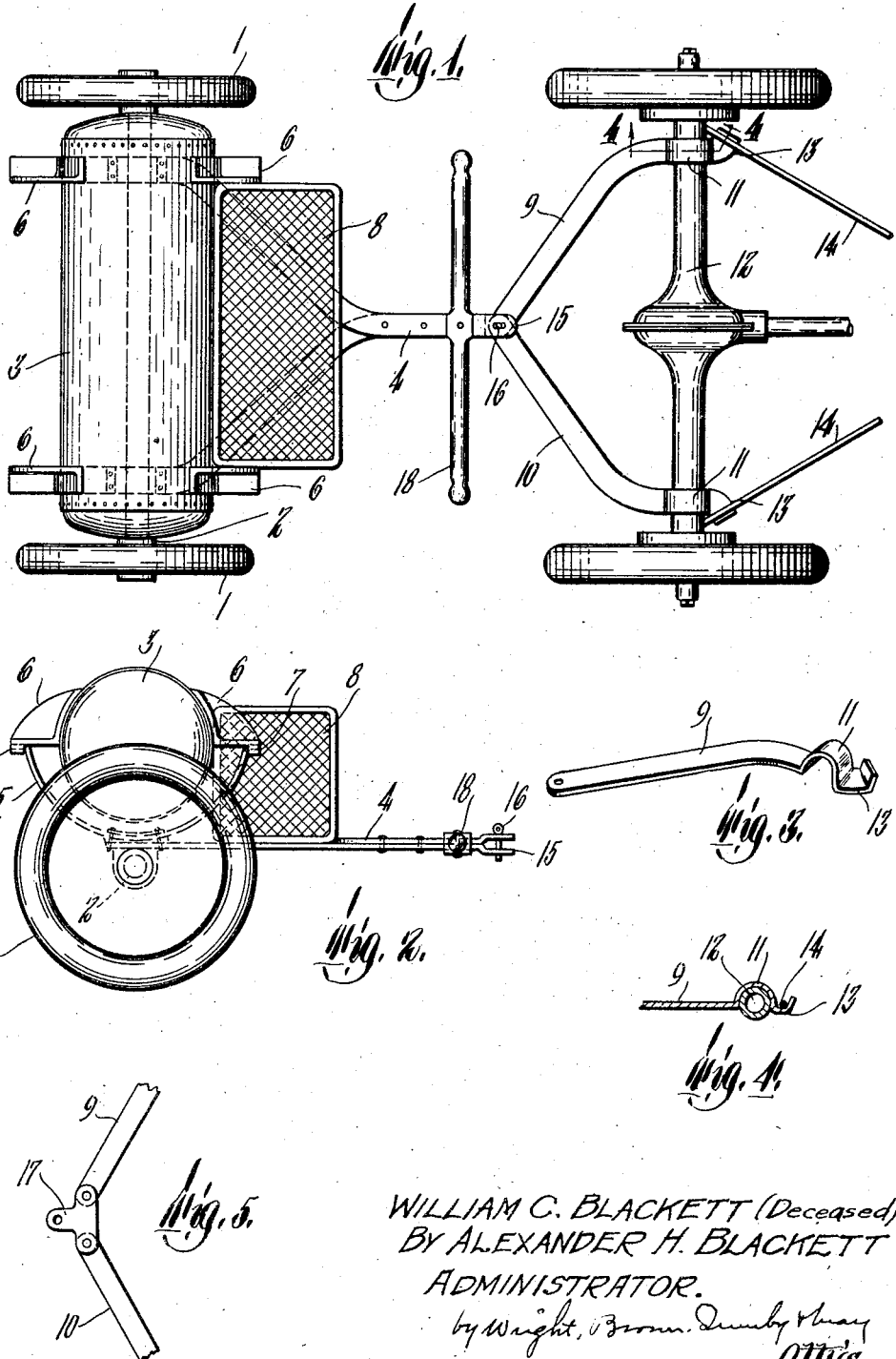
WILLIAM C. BLACKETT (Deceased)  
BY ALEXANDER H. BLACKETT  
ADMINISTRATOR.

Patented June 5, 1928.

1,672,598

UNITED STATES PATENT OFFICE.

WILLIAM C. BLACKETT, DECEASED, LATE OF WELLESLEY, MASSACHUSETTS, BY ALEXANDER H. BLACKETT, ADMINISTRATOR, OF WELLESLEY, MASSACHUSETTS, ASSIGNOR TO BADGER FIRE EXTINGUISHER COMPANY, OF BOSTON, MASSACHUSETTS, A CORPORATION OF MASSACHUSETTS.

AUTOMOBILE TRAILER CONNECTION.

Application filed March 13, 1926. Serial No. 94,533.

The present invention relates generally to a connection or hitch for attaching a trailer to an automobile, and more particularly to self-contained fire extinguishing apparatus of the wheeled type and to means for rendering such apparatus quickly available for emergency use in communities where automotive apparatus is not so available. The primary and more immediate object of the invention has been to provide for the use of sparsely settled districts and other communities which have no continuously manned fire fighting organizations and equipment, or are situated remote from the stations of such an organization, a simple and inexpensive type of fire extinguishing apparatus which may be purchased by the community at moderate cost and in sufficient numbers to permit units of such apparatus to be stored at scattered points; and to equip such units with means by which they may be easily and quickly attached, as trailers, to any of the automobiles which are widely and commonly possessed by residents of all localities. This object contemplates that in case of a fire occurring in such circumstances, there will be a fire extinguishing unit of this character at some point not greatly distant, at the farthest, from the place of the fire, preferably on the premises of an automobile owner, and that this person, or the first comer in an automobile, may immediately attach the extinguishing unit to his automobile and drive to the fire, with very good chances of arriving there in time to put it out before great damage has been done.

However, the invention is not limited to this object alone, but is concerned in a broader way with an improved connection applicable to automobiles, particularly Ford cars, by means of which a trailer of any nature, whether a fire extinguisher unit or one adapted to carry goods and baggage, may be attached to the automobile.

In the following specification explaining the invention, I will describe its adaptation to and combination with a fire extinguisher unit, as illustrative of its nature but not exclusive as to its character; claiming the invention, however, in its broader scope as well as in this combination. The invention also includes improvements in the wheeled fire extinguisher unit itself, and these improvements also are included in the claims.

In the drawings,—

Fig. 1 is a plan view of a wheeled fire extinguisher unit and a connector, embodying this invention, together with the rear end of a Ford automobile to which the connector is attached;

Fig. 2 is a side elevation of the fire extinguisher unit shown in Fig. 1;

Fig. 3 is a perspective view of one of the bars forming the connector;

Fig. 4 is a detail sectional view taken on line 4—4 of Fig. 1 showing the interlock effected between the connector and the automobile;

Fig. 5 is a detail plan view showing an alternative detail of construction of the connector.

Like reference characters designate the same parts wherever they occur in all the figures.

The fire extinguisher unit comprises a pair of road wheels 1, 1, or equivalent ground supports, a connecting axle 2, a tank or body 3, and a tongue 4. The tank is preferably a cylindrical tank nearly as long as the space between the wheels and arranged with its axis parallel to the axle 2. It is preferably mounted as low as possible, that is, just over the axle, being supported near either end by springs 5 secured to the branched members of the tongue, or otherwise stably mounted on the axle. Brackets 6 secured to the sides of the tank rest on the springs and have sockets 7 in which the ends of the springs are contained with freedom for the movement occasioned by flexing of the springs. These brackets, or the ends of the springs, cooperate with the wheels to form a stable base or standard to support the extinguisher on a floor or the ground when not in use; the whole apparatus then being tilted back and the tongue projecting upward.

I should say, that although the tank is here shown and described as consisting of a single cylinder with its axis horizontal, equivalent containers for an extinguishing charge may be otherwise constructed and arranged without departure from the essentials of the invention. For instance, there may be two or more tanks, of any shape, arranged side by side, or otherwise, and with their longer dimensions upright or extending from front to rear, as well as in the transverse arrangement here shown.

The tongue is preferably made of two straps or bars of iron or steel, connected to the axle near the wheels, and each extending thence diagonally toward a line midway between the wheels where they overlap, being extended forwardly from their junction and secured together. The separated ends of the straps may be provided with bearings or boxes of suitable character to receive the axle. These parts of the straps provide a convenient support and anchorage for the springs, and the latter are preferably secured thereto. A basket 8 is provided to carry a hose, which may be connected with the tank 3 in any suitable way well known in the art of fire extinguishers. This basket is supported on the straps forming the tongue in front of the tank and may be secured thereto in any suitable way.

The connector or coupling for attaching the fire extinguisher to an automobile consists of two bars or straps 9 and 10. Each of these bars has an upturned loop or inverted bend adapted to be slipped over the rear axle 12 of the automobile. The end part of the bar adjacent to the loop is carried forward and then upward, forming a hook 13 adapted to pass under and interlock with the diagonal braces 14 which lead forward from the axle near its ends. The automobile structure thus described is that of the well known Ford automobile. The bars formed are capable of being easily and quickly attached to the automobile and as easily detached therefrom. When so attached and connected to the trailer, they are securely interlocked with the automobile beyond any possibility of becoming detached by vibration or bumps, however severe. The said bars 9 and 10 are inclined toward one another from their points of connection with the axle, and overlap at their outer ends. Such outer ends are adapted to enter a fork 15 at the end of the tongue, in which they are retained by a coupling pin 16.

These bars may be entirely independent of each other when released from the coupling pin, or they may be coupled together in a manner permitting such independent movement of each as is necessary to interlock them with the automobile structure. For instance, they may be pivoted to a plate 17, as shown in Fig. 5, such plate having a tongue adapted to enter the fork 15 and be engaged by the coupling pin. Other modes of attaching the connector bars 9 and 10, either permanently or detachably, may be devised within the skill of the skilled mechanic. A certain extent of vertical motion angularly about the automobile axle as a pivot is necessary to hook the connector bars under the brace rods 19, or to detach them therefrom, and a certain amount of lateral movement (that is, movement lengthwise of the axle) in so doing is required owing to the diagonal arrangement of these brace rods; wherefore if the bars are permanently connected to the tongue of the trailer such connection must have flexibility enough to permit of such movements.

There is also secured to the tongue 4 a cross bar 18 to be used in moving the extinguisher unit about by hand.

Such a fire extinguisher as that here described may be stored in a shed or garage anywhere, charged ready for use, and upon breaking out of a fire, can be quickly coupled to the automobile nearest at hand, whether that be one kept on the same premises or one passing by. The connector has been designed with reference to speedy attachment to the most numerous and widely used make of cars; but in one aspect of the invention, which concerns the combination of a fire extinguisher with an automobile connector, the details of the connector adapting it especially to this make of car are not important but may be modified by substitution of or conversion into straps, hooks or clamps adapted to be secured to the axle, or some other part, of a car of a different make.

When thus coupled to the automobile, the extinguisher can be brought to the fire as quickly as the best motor fire engine, if available, could arrive.

The entire equipment involved in this invention is so simple and inexpensive that units of such equipment can be procured by even such sparsely settled towns and rural communities as could not afford to maintain fire engines of the type used in cities; and they may be used even more effectively by such communities than more expensive fire engines could be, because they may be provided in such large numbers as to permit being located at scattered points in different parts of the community, so that one or more of them would be nearer any outlying house where a fire might break out than a single centrally located apparatus would be.

The fire extinguishing charge carried in the tank may be any of those commonly used in portable fire extinguishers, although preferably one of a non-freezing character, since the conditions of use of this equipment would commonly include exposure to temperatures much below the freezing point of water. For instance, the charge may be water containing calcium chloride in solution, or a non-aqueous and non-inflammable liquid, such as carbon tetrachloride. Pressure for expelling the charge may be furnished by a sealed cartridge in the tank containing air, carbon dioxide, or other gas in highly compressed or liquefied condition, which may be released by puncturing the cartridge just prior to use; or by reagents capable of generating gas by reaction, which may be mixed together at the time of use. Such equipment, by the facility with which it may be brought to the place for use before the fire has gained much headway may be more effective than a fire engine of greater capacity and power which cannot be brought to the place of use so quickly.

What I claim as the invention of the said WILLIAM C. BLACKETT and desire to secure by Letters Patent is:

1. The combination with an automobile having a rear axle and diagonal brace rods leading from the ends of said axle, of connecting bars having hooks on their ends embracing said rods from beneath, and an upward bend adjacent to said hooks overlying and embracing the axle.

2. The combination with an automobile having a rear axle and diagonal brace rods leading forwardly from separated points on said axle, of connecting bars having hooks on their ends embracing said rods from beneath and having upward bends adjacent to said hooks passing over the axle, said rods being inclined toward and meeting one another in the rear of the axle, and a trailer having a tongue and coupling means connecting said tongue to the meeting ends of said bars.

3. An automobile trailer comprising wheels, an axle to which said wheels are pivoted, straps or bars connected to said axle at separated points and converging toward one another, meeting and being extended in connection with one another to form a tongue, load supporting springs mounted at their middle portions on said axle, extending upwardly to each end from their points of attachment, and a tank of less width than the distance between the ends of said springs extending with its length substantially parallel to the axle and occupying the space embraced by the springs, having brackets at opposite sides adjacent to each end resting on the extremities of the springs.

In testimony whereof I have affixed my signature.

ALEXANDER H. BLACKETT,
*Administrator of the Estate of William C. Blackett, Deceased.*